United States Patent
Hung et al.

(10) Patent No.: US 9,749,777 B2
(45) Date of Patent: Aug. 29, 2017

(54) MESSAGE NOTIFICATION METHOD AND MESSAGE TRANSMITTING-RECEIVING DEVICE PERFORMING THE SAME, MESSAGE ACCESS METHOD

(71) Applicant: GUNITECH CORP., Qionlin Township, Hsinchu County (TW)

(72) Inventors: Chien-Ju Hung, Qionlin Township (TW); Huan-Ruei Shiu, Qionlin Township (TW); Shih-Chao Sheng, Qionlin Township (TW); Ming-Yi Wang, Qionlin Township (TW); Enoch Zhao, Qionlin Township (TW)

(73) Assignee: Gunitech Corp., Qionlin Township (TW)

( * ) Notice: Subject to any disclaimer, the term of this patent is extended or adjusted under 35 U.S.C. 154(b) by 0 days.

(21) Appl. No.: 15/011,705

(22) Filed: Feb. 1, 2016

(65) Prior Publication Data
US 2016/0241990 A1    Aug. 18, 2016

(30) Foreign Application Priority Data

Feb. 17, 2015   (TW) .............................. 104105452 A

(51) Int. Cl.
| | |
|---|---|
| H04W 4/00 | (2009.01) |
| H04B 7/00 | (2006.01) |
| H04W 68/00 | (2009.01) |
| H04W 12/06 | (2009.01) |
| H04W 4/06 | (2009.01) |
| H04W 4/12 | (2009.01) |
| H04W 88/04 | (2009.01) |

(52) U.S. Cl.
CPC ............. *H04W 4/008* (2013.01); *H04W 4/06* (2013.01); *H04W 4/12* (2013.01); *H04W 12/06* (2013.01); *H04W 68/005* (2013.01); *H04W 88/04* (2013.01)

(58) Field of Classification Search
CPC ........ H04W 4/02; H04W 4/008; H04W 4/12; H04W 28/14; H04M 1/72522; H04M 3/53316; G06Q 20/32; G06Q 30/02; G06Q 30/0207; G06Q 30/0241; G06Q 30/0251; G06Q 30/0267; G06F 9/542
USPC .... 455/41.2, 41.3, 412.1, 412.2, 414.1, 466; 705/14.1, 14.65; 709/206
See application file for complete search history.

(56) References Cited

U.S. PATENT DOCUMENTS

| | | | |
|---|---|---|---|
| 8,621,520 B2 * | 12/2013 | Lo ........................ | G06Q 20/123 455/466 |
| 9,135,612 B1 * | 9/2015 | Proctor, Jr. .......... | G06Q 20/202 |

(Continued)

*Primary Examiner* — Quochien B Vuong
(74) *Attorney, Agent, or Firm* — Alan D. Kamrath; Kamrath IP Lawfirm, P.A.

(57) ABSTRACT

A message notification method is applied to a message transmitting-receiving device with a memory module, and the message transmitting-receiving device is linked to a first electronic device. The message notification method includes the steps of receiving a memo message from the first electronic device, and storing the memo message in the memory module; sending a broadcast signal; receiving a connection signal transmitted by a second electronic device after the second electronic device receives the broadcast signal; and linking the message transmitting-receiving device and the second electronic device according to the connection signal, and sending the memo message to the second electronic device.

3 Claims, 4 Drawing Sheets

(56) References Cited

U.S. PATENT DOCUMENTS

| | | | |
|---|---|---|---|
| 9,426,540 B2* | 8/2016 | Lin | H04N 21/4882 |
| 2004/0162059 A1 | 8/2004 | Hiltunen et al. | |
| 2009/0239555 A1 | 9/2009 | Sim et al. | |
| 2009/0319366 A1* | 12/2009 | Choi | G06Q 30/02 |
| | | | 705/14.49 |
| 2010/0280904 A1* | 11/2010 | Ahuja | G06Q 30/02 |
| | | | 705/14.58 |

* cited by examiner

MESSAGE NOTIFICATION METHOD AND MESSAGE TRANSMITTING-RECEIVING DEVICE PERFORMING THE SAME, MESSAGE ACCESS METHOD

BACKGROUND OF THE INVENTION

1. Field of the Invention

The present invention relates a message notification method and a message access method.

2. Description of the Related Art iBeacon™ is a new technology described by Apple Inc. as a new class of low-powered, low-cost transmitters. One of the applications is that iBeacon enables a smart phone or other devices with a specific mobile application to display specific advertisement information or other information on the screen of the smart phone or the other devices according to the broadcast signal transmitted by the iBeacon transmitter when in close proximity to the iBeacon. Thus, a user is able to know about promotional activities or popular items recommended by the shop which the user is visiting.

However, in some relevant applications, the advertisement information or other information must be provided by a server, which needs to be established especially for delivery of that information. That is, even though the iBeacon enables a smart phone or other device with a specific mobile application to receive the broadcast signal transmitted by the transmitter when in close proximity to the iBeacon, the message from the mobile application is provided by the user. In some relevant applications, however, the cost of the establishment and maintenance of the server is not affordable to a business. In addition, no mechanism exists for providing a message to a specific device in close proximity to the iBeacon. That is, when any user with a smart phone or other device with the specific mobile application approaches the transmitter, the same message is sent to each user and cannot be limited to only one specific user in close proximity to the iBeacon. Only in some applications is a message providing mechanism able to limit the recipient necessary.

SUMMARY OF THE INVENTION

It is an object of the present invention to provide a message notification method.

It is another object of the present invention to provide a message transmitting-receiving device performing the same.

It is still another object of the present invention to provide a message access method and computer program implementing the same.

To achieve the abovementioned objects, the message notification method of the present invention is applied to a message transmitting-receiving device which comprises a memory module and is capable of connecting with a first electronic device. The message notification method comprises the steps of: receiving a memo message sent by the first electronic device, and storing the memo message in the memory module; sending a broadcast signal, such that at least one second electronic device receives the broadcast signal when the at least one second electronic device is at or within a specific distance from the message transmitting-receiving device; receiving a connection signal sent by the at least one second electronic device after the least one second electronic device receives the broadcast signal; and connecting with the at least one second electronic device according to the connection signal, and sending the memo message to the at least one second electronic device after the connection between the message transmitting-receiving device and the at least one second electronic device is established.

The message transmitting-receiving device of the present invention is capable of connecting with a first electronic device, with the message transmitting-receiving device comprising: a memory module; a signal transmitter; a signal receiver used for receiving a memo message sent by the first electronic device; and a control unit electronically connected with the memory module, the signal transmitter and the signal receiver. The control unit is used for storing the memo message in the memory module and for controlling the signal transmitter to send a broadcast signal after the memo message is received by the signal receiver, such that at least one second electronic device receives the broadcast signal when it is at or within a specific distance from the message transmitting-receiving device, and sends a connection signal after receiving the broadcast signal. The signal transmitter is further used for receiving the connection signal, such that the control unit connects with the at least one second electronic device according to the connection signal, and sends the memo message to the at least one second electronic device via the signal transmitter after the connection between the message transmitting-receiving device and the at least one second electronic device is established.

The message access method of the present invention is applied to a second electronic device with a screen for acquiring a memo message stored in a message transmitting-receiving device. A first electronic device transmits the memo message to the message transmitting-receiving device, with the message access method comprising the steps of: receiving a broadcast signal sent by the message transmitting-receiving device; transmitting a connection signal to the message transmitting-receiving device according to the broadcast signal, such that the message transmitting-receiving device connects with the second electronic device according to the connection signal, and sending the memo message to the second electronic device between the message transmitting-receiving device and the second electronic device is established; and receiving the memo message sent by the message transmitting-receiving device, and displaying the memo message on the screen.

The computer program of the present invention operates a processor to carry out the steps of the above method after the processor loads and executes the computer program.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, similar reference numerals denote similar elements throughout the several views.

DETAILED DESCRIPTION OF THE PREFERRED EMBODIMENTS

To facilitate understanding and to clarify the objects, characteristics and advantages of the present invention, the following specific embodiments and figures illustrating the present invention are presented to provide a detailed description.

Figure 1:
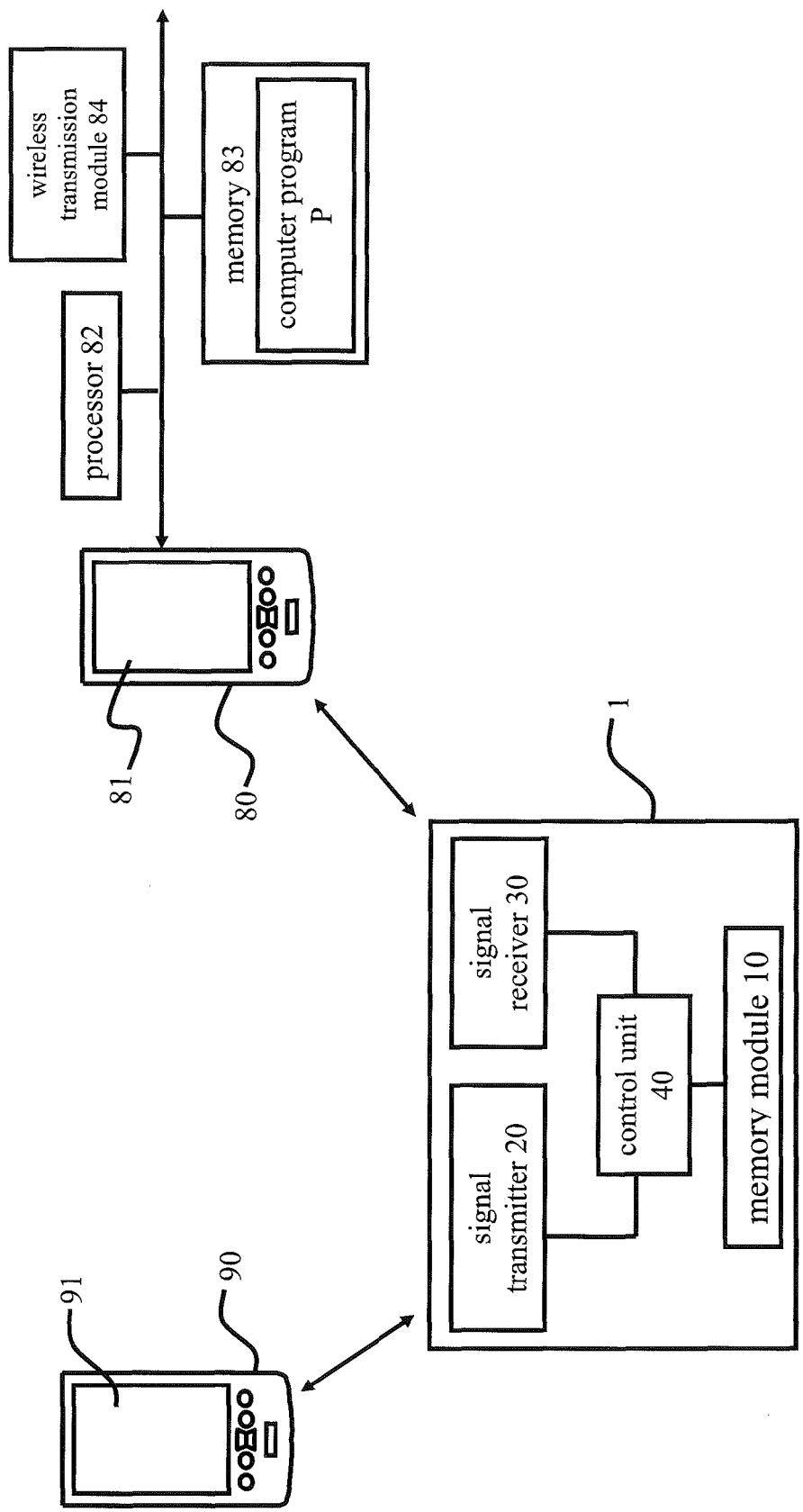
FIG. 1 is a schematic drawing of the environment illustrating the message notification method and the message access method.

Please refer to FIG. 1, which is a schematic drawing of the environment illustrating the message notification method and the message access method.

As shown in FIG. 1, in one embodiment of the present invention, the message notification method is applied to a message transmitting-receiving device 1, and the message access method is applied to a second electronic device 80. The message transmitting-receiving device 1 connects with a first electronic device 90 in a wireless transmission way, such that message data can be transmitted from the first electronic device 90 to the message transmitting-receiving device 1 after the connection between the message transmitting-receiving device 1 and the second electronic device 80 is established. In one embodiment of the present invention, the second electronic device 80 includes a screen 81, a processor 82, a memory 83 and a wireless transmission module 84. The processor 82 is electrically connected to the screen 81, the memory 83 and the wireless transmission module 84. A computer program P is stored in the memory 83. When the computer program P is loaded and executed by the processor 82, the message access method of the present invention can be achieved.

In one embodiment of the present invention, the message transmitting-receiving device 1 includes a memory module 10, a signal transmitter 20, a signal receiver 30 and a control unit 40. The signal receiver 30 is used to receive the memo message from the first electronic device 90 and the connection signal from the second electronic device 80. The control unit 40 is electrically connected to the memory module 10, the signal transmitter 20 and the signal receiver 30. The control unit 40 is used to store the memo message in the memory module 10 and control the signal transmitter 20 to transmit a broadcast signal after the memo message is received by the signal receiver 30, and connect with the wireless transmission module 84 of the second electronic device 80 according to the connection signal when the connection signal is received by the signal receiver 30. After the connection is established, the control unit 40 is able to transmit the memo message to the second electronic device 80 via the signal transmitter 20. In the embodiment of the present invention, the control unit 40 is a microprocessor. More specifically, the control unit 40 of the message transmitting-receiving device 1 of the present invention is able to achieve the message notification method by loading the firmware program command on the basis of the control chip of the base station of iBeacon™. However, the present invention is not limited to this description. In the embodiment of the present invention, the wireless transmission module 84 of the second electronic device 80 is a blue-tooth module but is not limited to that design.

Figure 2:
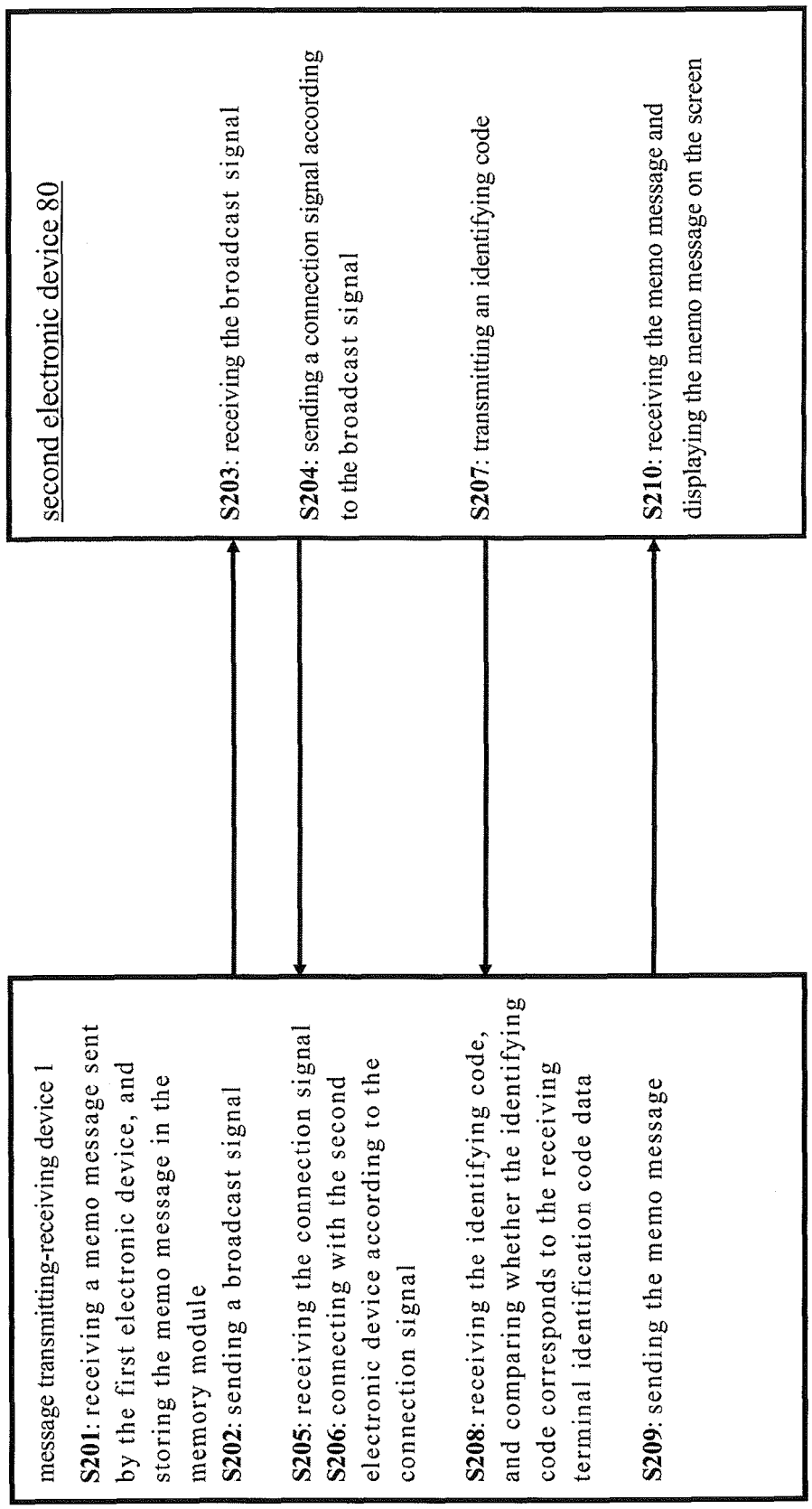
FIG. 2 is a flowchart illustrating the message notification method and the message access method according to the first embodiment.

Hereinafter, please refer to FIG. 1 and FIG. 2. FIG. 2 is a flowchart illustrating the message notification method and the message access method according to the first embodiment. Each step of the message notification method and the message access method will be described with reference to FIG. 1. It should be noted that the abovementioned message transmitting-receiving device 1 and the second electronic device 80 are used as examples to describe the message notification method and the message access method, but the two methods are not limited to application in the message transmitting-receiving device 1 and the second electronic device 80.

A user of the first electronic device 90 leaves a message for a user of the second electronic device 80 in a specific circumstance. For example, the user of the first electronic device 90 is a wife in a family. Before she leaves home, she wants to leave a message for her sleeping husband to remind him when he walks into the kitchen that his lunch is in the refrigerator. Thus, the wife (the user of the first electronic device 90) leaves a message (a memo message) in the message transmitting-receiving device 1 by using the first electronic device 90. In the embodiment of the present invention, in addition to the message content, the memo message further includes the receiving terminal identification code data for the second electronic device 80 appointed by the user of the first electronic device 90 to receive the memo message. For example, the memo message of the wife is only for the husband, and no other family members can read the message. Then, the wife may set the limitation that the memo message can be read only by the second electronic device 80 used by the husband when she is leaving the memo message.

Figure 3:
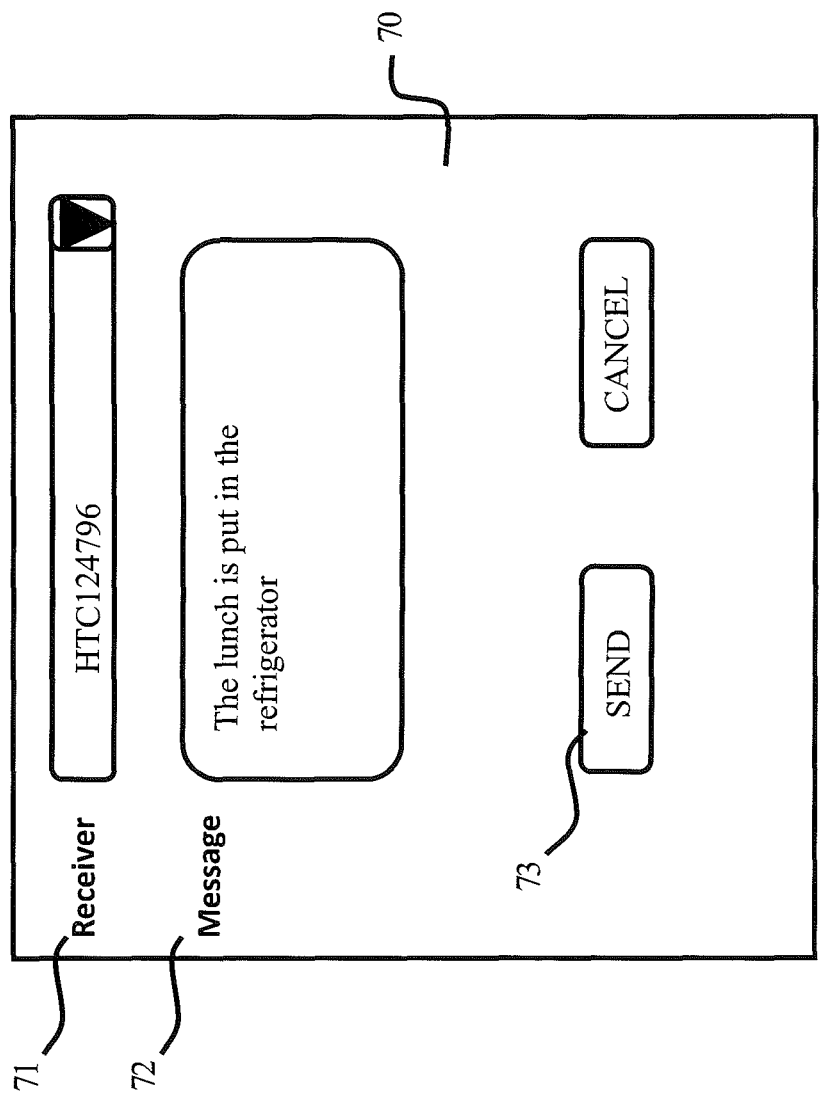
FIG. 3 is a schematic drawing illustrating the messaging interface.

In the achievable embodiment applying the abovementioned steps, through the specific application applied on the first electronic device 90, the messaging interface 70 shown as FIG. 3 is displayed on the screen 91 of the first electronic device 90 and provides a messaging field for the user. In addition to the messaging field 72, the messaging interface 70 further includes a setting field 71. Different device names linked to different receiving terminal identification code data are displayed after the user clicks the dropdown arrow in the setting field 71. The data is received by the first electronic device 90 via a predetermined group setting. The user may choose one of the device names and may set which receiving terminal identification code data is to be included in the memo message. For example, the different device names include the device names of the second electronic devices 80 used by the husband, the son, and the daughter in a family. If the wife wants to leave a message only for her husband, the device name of the device used by her husband should be selected in the setting field 71. The device name linked to the receiving terminal identification code data is transmitted to the message transmitting-receiving device 1 when the wife leaves the memo message.

After the user finishes composing the memo message and clicks the transmitting button 73 on the messaging interface 70, the memo message is sent to the message transmitting-receiving device 1. Oppositely, the signal receiver 30 of the message transmitting-receiving device 1 receives the memo message from the first electronic device 90, and the memo message is temporarily stored in the memory module 10 by the control unit 40 (that is, executing step S201).

In the first embodiment of the present invention, after the memo message is temporarily stored in the memory module 10 by the control unit 40, the control unit 40 controls the signal transmitter 20 to send a broadcast signal (that is, executing step S202). Thus, when the second electronic device 80 is at or within a specific distance (e.g., 5 meters) from the message transmitting-receiving device 1, the second electronic device 80 is informed that there is a memo message in the message transmitting-receiving device 1 via the broadcast signal. The broadcast signal is sent repeatedly at regular intervals (e.g., 2 sec) until the recipient reads the memo message.

When the second electronic device 80 is at or within a specific distance from the message transmitting-receiving device 1, the second electronic device 80 receives the broadcast signal (that is, executing step S203) and sends the connection signal back to the message transmitting-receiving device 1 (that is, executing step S204). Oppositely, the signal receiver 30 of the message transmitting-receiving device 1 receives the connection signal from the second electronic device 80 (that is, executing step S205).

After step S205 is executed, the control unit 40 of the message transmitting-receiving device 1 connects with the wireless transmission module 84 of the second electronic device 80 according to the received connection signal (that is, executing step S206). After the connection is established, the message transmitting-receiving device 1 connects with the second electronic device 80 wirelessly.

After the connection between the second electronic device 80 and the message transmitting-receiving device 1 is established, the processor 82 executing the computer program P transmits an identification code of the second electronic device 80 to the message transmitting-receiving device 1 (that is, executing step S207). Oppositely, the signal receiver 30 of the message transmitting-receiving device 1 receives the identification code from the second electronic device 80, and the control unit 40 compares whether the identification code corresponds to the receiving terminal identification code data (that is, executing step S208). If yes, the control unit 40 sends the memo message stored temporarily in the memory module 10 to the second electronic device 80 via the signal transmitter 20 (that is, executing step S209). If not, the memo message is not sent.

When the second electronic device 80 receives the memo message, the processor 82 immediately displays the memo message on the screen (that is, executing step S210). Thus, the user of the second electronic device 80 acquires the memo message immediately upon approaching the message transmitting-receiving device 1.

It should be noted that the message notification method and the message access method of the present invention are not limited to the abovementioned sequence of steps. As long as the purpose of the present invention can be achieved, the step sequence may be changed, and some of the steps may be removed. For example, verification of the identification code is used only to increase the privacy in order to ensure that the memo message is received by a specific person. If the present invention is used in a family having low privacy requirements, the verification steps (that is, steps S207 and S208) may be ignored. If so, no matter which second electronic device 80 approaches the message transmitting-receiving device 1, the memo message will be read after the connection is established.

Figure 4:
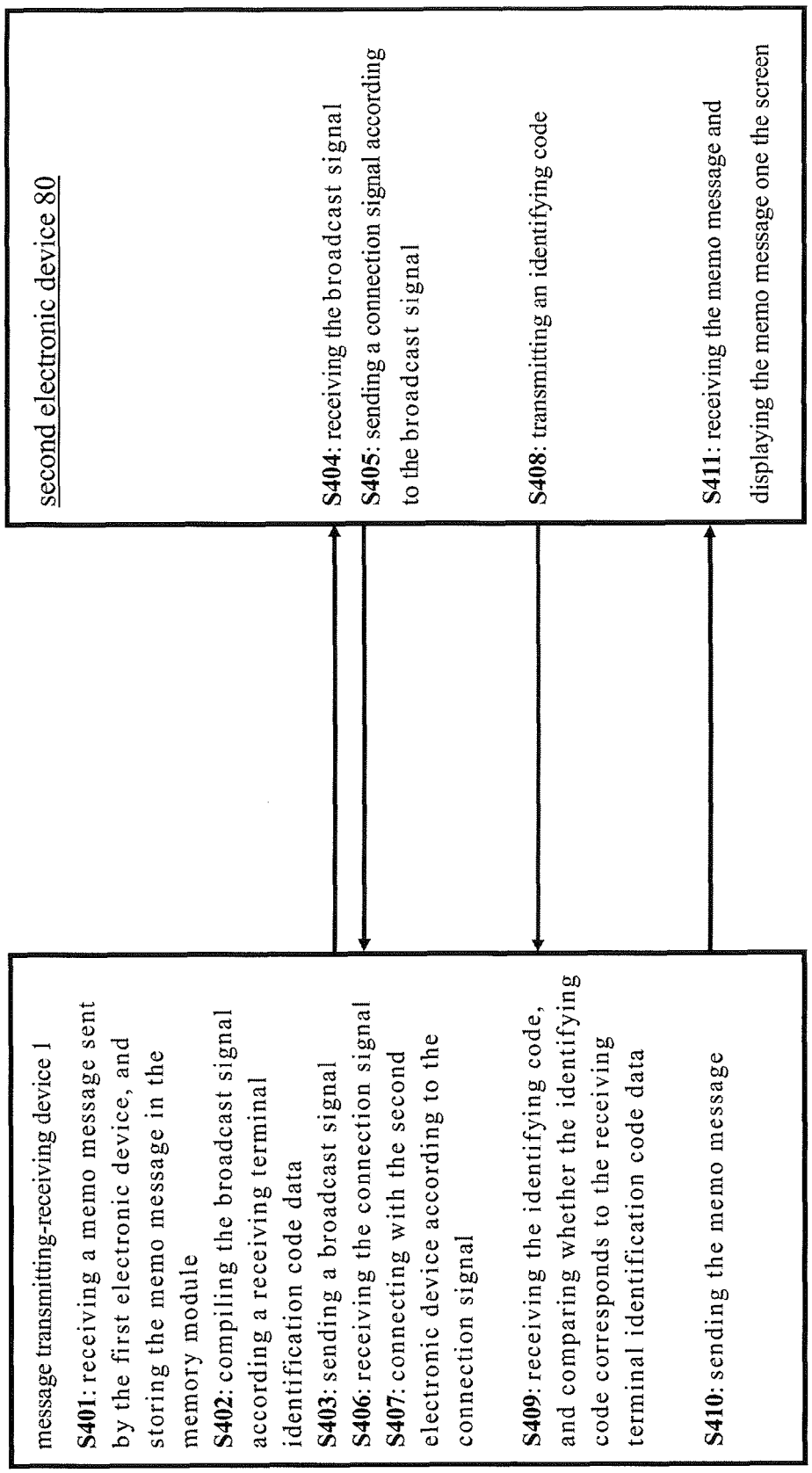
FIG. 4 is a flowchart illustrating the message notification method and the message access method according to the second embodiment.

Finally, please refer to FIG. 1 and FIG. 4. FIG. 4 is a flowchart illustrating the message notification method and the message access method according to the second embodiment.

In the second embodiment of the present invention, the difference between the second embodiment and the abovementioned first embodiment is that the control unit 40 compiles the broadcast signal according to the receiving terminal identification code data after the message transmitting-receiving device 1 receives the memo message (that is, adding step S402, and steps S401, S403, S404, S405, S406, S407, S408, S409, S410 and S411 are respectively the same as steps S201, S202, S203, S204, S205, S206, S207, S208, S209 and S210). Therefore, only one specific second electronic device 80 transmits the connection signal back when a plurality of second electronic devices 80 is at a specific distance from the message transmitting-receiving device 1 and receives the broadcast signal. For example, in the mentioned embodiment, if the wife (the user of the first electronic device 90) sets the recipient as her husband and the second electronic device 80 used by the son is at or within a specific distance from the message transmitting-receiving device 1, the control unit 40 compiling the broadcast signal according to the receiving terminal identification code data will not trigger the second electronic device 80 used by the son. That is, even if the second electronic device 80 used by the son receives the compiled broadcast signal, the second electronic device 80 will not execute steps S405, S408 and S411 corresponding to FIG. 4. Oppositely, if the second electronic device 80 used by the husband is at or within a specific distance from the message transmitting-receiving device 1, the second electronic device 80 will execute steps S405, S408 and S411 corresponding to FIG. 4.

As explained in the description above, the message transmitting-receiving device 1 of the present invention is a medium for a user to leave messages. The message transmitting-receiving device is set in different environments for different requirements. Therefore, people receive memo messages when they enter a specific place such that the memo messages can be used to deliver locally-relevant information to the recipients effectively.

Although the present invention has been explained in relation to its preferred embodiments, it is to be understood that many other possible modifications and variations can be made without departing from the spirit and scope of the invention as hereinafter claimed.

What is claimed is:

1. A message notification method comprising:
providing a message transmitting-receiving device comprising a memory module and connecting with a first electronic device;
receiving a memo message sent by the first electronic device and comprising a message data and a receiving terminal identification code data, and storing the memo message in the memory module;
compiling a broadcast signal according to the receiving terminal identification code data and sending the broadcast signal;
receiving the broadcast signal by only one of a plurality of second electronic devices when the plurality of second electronic devices is at or within a specific distance from the message transmitting-receiving device;
receiving a connection signal sent by the only one of a plurality of second electronic devices after receiving the broadcast signal; and
connecting with the only one of the plurality of electronic devices according to the connection signal;
receiving an identification code and comparing whether the identification code corresponds to the receiving terminal identification code data; and
when the identification code corresponds to the receiving terminal identification code data, sending the memo message to the only one of the plurality of second electronic devices.

2. A message transmitting-receiving device comprising:
a first electronic device;
a memory module;
a signal transmitter;

a signal receiver receiving a memo message sent by the first electronic device, wherein the memo message comprises a message data and a receiving terminal identification code data; and a control unit electronically connected with the memory module, the signal transmitter and the signal receiver, with the control unit storing the memo message in the memory module, compiling a broadcast signal according to the receiving terminal identification code data and controlling the signal transmitter to send the broadcast signal, wherein only one of a plurality of second electronic devices receives the broadcast signal when the plurality of second electronic devices is at or within a specific distance from the message transmitting-receiving device, and sends a connection signal after receiving the broadcast signal, with the signal transmitter receiving the connection signal, wherein the control unit connects with the only one of the plurality of second electronic devices according to the connection signal, wherein the signal receiver receives an identification code after a connection between the message transmitting-receiving devices and the only one of the plurality of second electronic devices is established; wherein the control unit compares whether the identification code corresponds to the receiving terminal identification code data, and sends the memo message to the only one of the plurality of second electronic devices via the signal transmitter when the identification code corresponds to the receiving terminal identification code data.

3. A message access method comprising:

transmitting a memo message by a first electronic device, wherein the memo message comprises a message data and a receiving terminal identification code data;

storing the memo message in a message transmitting-receiving device;

acquiring the stored memo message by a second electronic device having a screen;

receiving a broadcast signal sent by the message transmitting-receiving device;

transmitting a connection signal to the message transmitting-receiving device according to the broadcast signal, and connecting the message transmitting-receiving device with the second electronic device according to the connection signal;

sending an identification code to the message transmitting-receiving device, with the message transmitting-receiving device comparing whether the identification code corresponds to the receiving terminal identification code data and sending the memo message when the identification code corresponds to the receiving terminal identification code data; and receiving the memo message sent by the message transmitting-receiving device, and displaying the memo message on the screen.

* * * * *